(12) United States Patent
Gagne-Keats et al.

(10) Patent No.: US 10,353,842 B2
(45) Date of Patent: *Jul. 16, 2019

(54) SYSTEMS AND TECHNIQUES FOR INTELLIGENTLY SWITCHING BETWEEN MULTIPLE SOURCES OF UNIVERSAL SERIAL BUS SIGNALS

(71) Applicant: Essential Products, Inc., Palo Alto, CA (US)

(72) Inventors: Jason Sean Gagne-Keats, Cupertino, CA (US); Andrew E. Rubin, Los Altos, CA (US); David John Evans, V, Palo Alto, CA (US); Matthew Hershenson, Los Altos, CA (US); Xiaoyu Miao, Palo Alto, CA (US); Xinrui Jiang, San Jose, CA (US); Joseph Anthony Tate, San Jose, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/833,830

(22) Filed: Dec. 6, 2017

(65) Prior Publication Data

US 2018/0095922 A1 Apr. 5, 2018

Related U.S. Application Data

(63) Continuation of application No. 15/411,519, filed on Jan. 20, 2017, now Pat. No. 9,852,098.
(Continued)

(51) Int. Cl.
*G06F 13/40* (2006.01)
*H04M 1/02* (2006.01)
(Continued)

(52) U.S. Cl.
CPC ...... *G06F 13/4022* (2013.01); *G06F 13/4282* (2013.01); *H04M 1/0274* (2013.01); *H04M 1/7253* (2013.01); *H04M 1/72527* (2013.01)

(58) Field of Classification Search
CPC ............ G06F 13/4022; G06F 13/4282; H04M 1/0274; H04M 1/72527; H04M 1/7273
(Continued)

(56) References Cited

U.S. PATENT DOCUMENTS 6,128,743 A 10/2000 Rothenbaum
6,137,802 A * 10/2000 Jones ................. H04Q 11/0478
370/401

(Continued)

OTHER PUBLICATIONS

Universal Serial Bus 3.1 Specification revision 1.0 Jul. 26, 2013 (Year: 2013).*
(Continued)

*Primary Examiner* — Paul R. Myers
(74) *Attorney, Agent, or Firm* — Perkins Coie LLP

(57) ABSTRACT

Various embodiments concern techniques for intelligently switching between multiple sources of USB signals. More specifically, user devices are described that include a physical USB port for receiving a USB connector and one or more wireless transceivers that communicate with an accessory. The wireless transceiver(s) may communicate with the accessory using a USB-based protocol (e.g., Wireless USB). The user devices described herein can intelligently switch between these different sources of USB signals so that USB signals can be simultaneously or sequentially received from a peripheral (via the USB port) and an accessory (via the wireless transceiver(s)). In some embodiments, a switching routine is executed (e.g., by a processor or signal switch) that determines which peripheral and/or accessory is connected to a user device at a given point in time.

19 Claims, 8 Drawing Sheets

Related U.S. Application Data

(60) Provisional application No. 62/329,894, filed on Apr. 29, 2016, provisional application No. 62/300,631, filed on Feb. 26, 2016.

(51) Int. Cl.
    *G06F 13/42* (2006.01)
    *H04M 1/725* (2006.01)

(58) Field of Classification Search
    USPC .......................................................... 710/304
    See application file for complete search history.

(56) References Cited

U.S. PATENT DOCUMENTS

| | | | |
|---|---|---|---|
| 6,516,205 B1 * | 2/2003 | Oguma | G06F 13/4022 455/556.1 |
| 6,804,532 B1 | 10/2004 | Moon et al. | |
| 6,856,799 B1 | 2/2005 | Ritter | |
| 7,334,072 B1 | 2/2008 | Wright | |
| 7,966,437 B1 | 6/2011 | Spoden | |
| 8,630,592 B2 * | 1/2014 | Rajamani | H04W 36/385 455/74 |
| 8,686,685 B2 | 4/2014 | Moshfeghi | |
| 8,947,042 B2 | 2/2015 | Kirby et al. | |
| 9,178,369 B2 * | 11/2015 | Partovi | H02J 7/025 |
| 9,362,664 B2 * | 6/2016 | Yen | H01R 13/6205 |
| 9,548,622 B2 | 1/2017 | Vick et al. | |
| 9,608,472 B2 | 3/2017 | Moshfeghi | |
| 9,761,924 B2 * | 9/2017 | Lagnado | H01Q 1/44 |
| 9,820,320 B2 * | 11/2017 | Cohn | H04W 76/14 |
| 9,852,098 B2 * | 12/2017 | Gagne-Keats | H04M 1/72527 |
| 2003/0065816 A1 * | 4/2003 | Dharmadhikari | H04L 45/02 709/240 |
| 2003/0086388 A1 | 5/2003 | Peters et al. | |
| 2003/0100263 A1 * | 5/2003 | Tanaka | G06F 1/1616 455/41.1 |
| 2003/0129978 A1 | 7/2003 | Akiyama et al. | |
| 2004/0148445 A1 * | 7/2004 | Lee | G06F 1/1616 710/72 |
| 2005/0020319 A1 * | 1/2005 | Kim | H04N 7/163 455/566 |
| 2006/0025105 A1 * | 2/2006 | Sato | H04M 1/72527 455/343.1 |
| 2006/0179144 A1 * | 8/2006 | Nagase | G06F 13/387 709/226 |
| 2007/0073842 A1 | 3/2007 | Uehara | |
| 2007/0162634 A1 * | 7/2007 | Okazaki | G06F 13/387 710/15 |
| 2007/0204069 A1 | 8/2007 | Bhesania et al. | |
| 2008/0028118 A1 | 1/2008 | Sayers et al. | |
| 2008/0037506 A1 | 2/2008 | Dharmaraju et al. | |
| 2008/0311765 A1 * | 12/2008 | Chatterjee | G06F 3/03543 439/38 |
| 2009/0002546 A1 * | 1/2009 | Toyoda | H04N 1/00222 348/372 |
| 2009/0132816 A1 * | 5/2009 | Lee | G06F 9/455 713/164 |
| 2009/0247082 A1 * | 10/2009 | Sathath | G06F 1/1616 455/41.2 |
| 2010/0077109 A1 * | 3/2010 | Yan | G06F 1/1632 710/17 |
| 2010/0081473 A1 | 4/2010 | Chatterjee et al. | |
| 2010/0095026 A1 * | 4/2010 | Nagai | H04L 67/141 710/16 |
| 2010/0272102 A1 * | 10/2010 | Kobayashi | H04N 21/4305 370/389 |
| 2011/0022350 A1 | 1/2011 | Chatterjee | |
| 2014/0075054 A1 | 3/2014 | Lydon et al. | |
| 2014/0201399 A1 * | 7/2014 | Brabenac | G06F 13/10 710/63 |

OTHER PUBLICATIONS

Universal Serial Bus Type-C Cable and connector Specification Revision 1.1 Apr. 3, 2015 (Year: 2015).*
Agere Systems Inc., et al., "Wireless Universal Serial Bus Specification", Revision 1.0, May 12, 2005, 302 pages.
Hewlett-Packard Company, et al., "Universal Serial Bus 3.1 Specification", Revision 1.0, Jul. 26, 2013, 631 pages.
Promoter Group, "Universal Serial Bus Type-C Cable and Connector Specification", USB 3.0 Promoter Group. Revision 1.0, Aug. 11, 2014, 6 pages.

* cited by examiner

SYSTEMS AND TECHNIQUES FOR INTELLIGENTLY SWITCHING BETWEEN MULTIPLE SOURCES OF UNIVERSAL SERIAL BUS SIGNALS

CROSS REFERENCE TO RELATED APPLICATIONS

This application is a continuation of U.S. patent application Ser. No. 15/411,519, filed Jan. 20, 2017, which claims the benefit of U.S. Provisional Patent Application No. 62/329,894, filed Apr. 29, 2016, and U.S. Provisional Patent Application No. 62/300,631, filed Feb. 26, 2016, each of which is incorporated herein in its entirety.

RELATED FIELD

Various embodiments relate generally to processing data signals received by electronic devices. More specifically, various embodiments relate to intelligently switching between multiple sources of Universal Serial Bus (USB) signals.

BACKGROUND

Universal Serial Bus (USB) is an industry-standard communication protocol that defines how electronic devices can communicate and transfer power between one another. USB was developed in the mid-1990s in an effort to standardize the connection of peripherals, such as input devices (e.g., mice and keyboards), printers, portable media players, and disk drives. USB ports have become a common sight on many electronic devices. For example, one or more physical USB ports are often found on electronic devices, such as mobile phones, tablets, personal computers, and video game consoles.

New functionalities or abilities can be provided by connecting a peripheral to an electronic device. For example, video recorders ("webcams"), input devices, and external storage can easily be connected to the USB port of a personal computer through a wired connection (e.g., via a USB cable).

Wired connections ensure that data and/or power can be more consistently delivered from an electronic device to the peripheral, or vice versa. For example, an external storage device may be configured to transfer data and power via a single wired connection with a USB port of the electronic device. However, wired connections may be undesirable from an aesthetic perspective and are often impractical in certain situations (e.g., when clear channels between the peripheral and the electronic device are not available). Wireless connections, meanwhile, may have poor connectivity and/or limited bandwidth that impact a user's ability to utilize a peripheral. Moreover, wireless peripherals typically require a dedicated power source that requires its own wired connection (e.g., a dedicated AC/DC adapter) or must be periodically replaced (e.g., a battery).

SUMMARY

Techniques for intelligently switching between multiple sources of USB signals are described herein. More specifically, user devices are described that include a physical USB port for receiving a USB connector (which is part of a peripheral device or a USB cable) and a wireless accessory bus for receiving an accessory. The USB connector enables data and/or power to be transferred between a user device and a peripheral. The wireless accessory bus enables data and/or power to be wirelessly transferred between the user device and an accessory when the accessory and the user device are located within close proximity to one another (e.g., when the accessory is securely attached to the wireless accessory bus).

Although the wireless accessory bus (and, more specifically, a wireless transceiver) is not a physical USB interface, the wireless accessory bus may communicate with the accessory using a USB-based protocol (e.g., Wireless USB). Consequently, the user device can have at least two different sources of USB signals (i.e., the USB port and the wireless accessory bus).

Techniques are described herein for intelligently switching between the different sources in order to properly process the USB signals and attribute each USB signal to the correct source. For example, the user device may execute a switching routine that determines when to switch between the at least two sources. In some embodiments, the switching routine is based at least in part on a state machine that transitions between the sources upon determining a triggering event (e.g., reception of a USB signal at either the USB port or the wireless accessory bus) has occurred that prompts a transition. Additionally or alternatively, the switching routine could be based at least in part on an algorithm that determines whether signal(s) are presently being received at particular physical contacts or "pins." For example, the algorithm may monitor a signal is presently being received at the ground pin, power pin, or reception/transmission pins of a USB Type-C port.

Both peripherals and accessories typically provide the user device with a new functionality or improve an existing functionality. Examples of peripherals include input devices (e.g., mice and keyboards), printers, portable media players, external storage devices, disk drives, power supplies (e.g., outlets and other electronic devices), etc. Examples of accessories include depth sensors, external storage devices, digital cameras, auxiliary power supplies, displays, etc.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
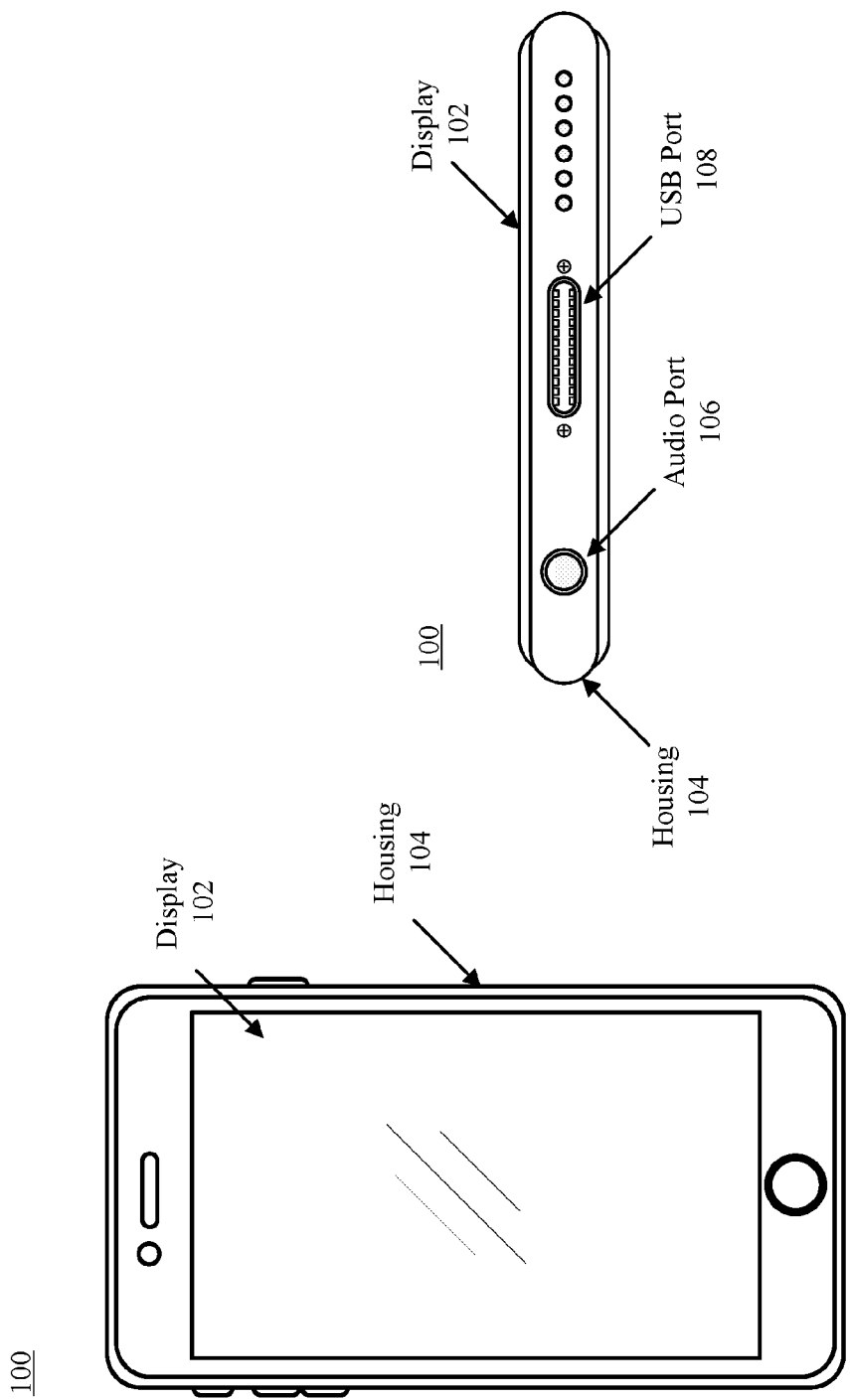
FIG. 1A is a front view of a user device that includes a display disposed in a housing that protects various components that reside within the user device.
FIG. 1B is a bottom view of the user device that depicts an audio port and a Universal Serial Bus (USB) port.

Techniques for intelligently switching between multiple sources of USB signals are described herein. More specifically, user devices are described that include a physical USB port for receiving a USB connector (i.e., a physical interface that is part of a peripheral device or a USB cable) and a wireless accessory bus for receiving an accessory. Although the wireless accessory bus is not a physical USB interface, the wireless accessory bus may communicate with the accessory using a USB-based protocol (e.g., Wireless USB). The user device intelligently switches between these different sources of USB signals so that USB signals can be simultaneously or sequentially received from a peripheral and an accessory.

Said another way, the user device executes a switching routine to determine which peripherals and/or accessories are connected to the user device at a given point in time. In some embodiments, the switching routine is implemented by a signal switch that is coupled to both the USB port and the wireless accessory bus (and, more specifically, one or more wireless transceivers). After determining which source is receiving USB signals, the signal switch can pass the USB signals to a processor.

These techniques can be used with any electronic device (also referred to herein as a "user device") that includes multiple USB interfaces, such as personal computers, tablets, personal digital assistants (PDAs), mobile phones, game consoles (e.g., Sony PlayStation or Microsoft Xbox), mobile gaming devices (e.g. Sony PSP or Nintendo 3DS), music players (e.g., Apple iPod Touch), wearable electronic devices (e.g., watches), network-connected ("smart") devices (e.g., televisions), and other portable electronic devices.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that an element or feature can be described in more than one way.

Consequently, alternative language and synonyms may be used for any one or more of the terms discussed herein, and special significance is not to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to the various embodiments given in this specification.

System Overview

FIG. 1A is a front view of a user device 100 that includes a display 102 disposed within a housing 106 that protects various components (e.g., sensors, connectors, power supply) that reside within the user device 100. The housing 106 is typically composed of a protective substrate, such as metal or plastic. In some embodiments, the display 102 is touch sensitive and is configured to generate signals responsive to a user contacting the outer surface of the display 102.

The user device could include other features as well, such as a camera and a touch-sensitive button that are offset from the display 102. The camera and/or touch-sensitive button may be located within an opaque border that surrounds the display 102 and that is not responsive to user interactions (i.e., is not touch sensitive). The opaque border is often used to hide the various components that reside within the user device 100.

FIG. 1B is a bottom view of the user device 100 that depicts an audio port 106 and a USB port 108. The audio port 106 (also referred to as an "audio jack") is a receptacle or jack that can be used to transmit analog signals, such as audio. More specifically, the audio port 106 typically includes two, three, or four contacts that enable audio signals to be readily transmitted when an appropriate plug is inserted into the audio port 106. For example, most speakers and headphones include a plug designed for a 3.5 mm audio jack.

The USB port 108 enables the user device 100 to be physically connected directly to a peripheral via a USB connector, which is part of the peripheral or a USB cable. The peripheral could be a source or recipient of data and/or power (e.g., a power outlet, external memory, set of headphones, or personal computer). One or more additional ports could be present that are capable of interfacing with a micro-USB adapter, a 30-pin adapter, or a proprietary bus (e.g., Apple Lightning). Together, the audio port 106 and USB port 108 can enable peripherals to be fastened directly to the user device 100. However, as noted above, physical (i.e., "wired") connections may be undesirable for both aesthetic and functional reasons.

In some embodiments, the USB port 108 is a USB Type-C port (also referred to as "USB-C port") that is designed to interface with a small 24-pin reversible-plug connector for peripherals (e.g., devices and cables). Because a USB Type-C port can be used to transfer both power and data (including analog signals such as audio), some embodiments of the user device 100 may not include a distinct audio port 106.

Although FIGS. 1A-B include an illustration of a mobile phone, the techniques described herein can also be used with other electronic devices that include USB ports for transferring data and/or power. For example, the same techniques could be utilized with personal computers, tablets, personal digital assistants (PDAs), mobile phones, game consoles (e.g., Sony PlayStation or Microsoft Xbox), mobile gaming devices (e.g. Sony PSP or Nintendo 3DS), music players (e.g., Apple iPod Touch), wearable electronic devices (e.g., watches), network-connected ("smart") devices (e.g., televisions), and other portable electronic devices.

Figure 2:
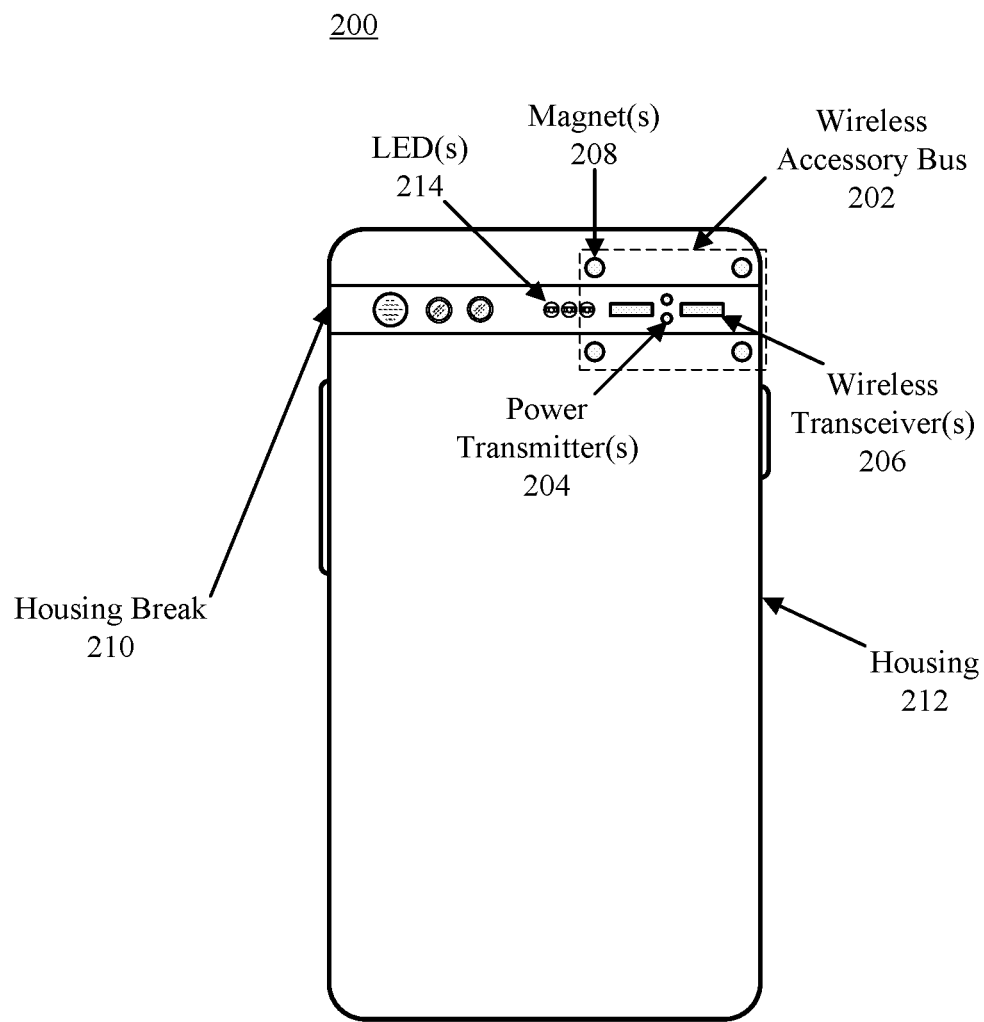
FIG. 2 is a rear view of a user device that includes a wireless accessory bus capable of receiving an accessory.

FIG. 2 is a rear view of a user device 200 that includes a wireless accessory bus 202 capable of receiving an accessory. An accessory could be, for example, a digital camera, a depth sensor, an external storage device, an auxiliary power supply, an infrared sensor/camera, a laser rangefinder, a structured-light three-dimensional (3D) scanner, a memory card reader, an audio output device (e.g., speaker, headphones), or a supplemental display (e.g., an electronic ink display or LCD display). One skilled in the art will recognize that many other accessories offering different functionalities could also utilize the technology described herein.

The wireless accessory bus 202 enables data and/or power to be wirelessly transferred from the user device 200 to the accessory (or vice versa) when the user device 200 and the accessory are within close proximity to one another. For example, a bi-directional communication channel may be established when the accessory is securely attached to the wireless accessory bus 202.

As shown in FIG. 2, the term "wireless accessory bus" refers generally to an area of the user device 200 that is configured to securely receive an accessory. The wireless accessory bus 202 can include one or more power transmitters 204, one or more wireless transceivers 206, and/or one or more magnets 208 (collectively referred to as the "bus components").

Some of these bus components could be at least partially exposed. For example, the magnet(s) 208 may be exposed through opening(s) in the housing 212. Additionally or alternatively, some of these bus components could be secured within the housing 212. In such embodiments, the bus components may be selected in order to compensate for signal degradation that occurs as the data signals and/or power signals traverse through the housing 212 or a substrate laid within a break 210 in the housing 212. The substrate may be an optically-clear substrate, such as glass or plastic. However, the housing 212 may not always include a break 210 within which certain features (e.g., the bus components, a camera, or a lighting element, such as a light-emitting diode) are positioned. In some embodiments, the housing 212 does not include any breaks, and the bus component(s) can instead protrude through openings in the housing 212 or be disposed entirely within the housing 212.

The power transmitter(s) 204 are configured to transfer power from a power supply (e.g., a battery) retained within the housing 212 to an accessory via a wired or wireless electrical coupling. For example, the power transmitter(s) 204 may include one or more electrical contacts (e.g., pin terminals) that are able to physically contact one or more electrical contacts of the accessory. As another example, the power transmitter(s) 204 may include integrated circuits ("chips") that are able to wirelessly transmit power from the user device to the accessory. In some embodiments, the power supply is a rechargeable battery (e.g., a rechargeable lithium-ion (Li-Ion) battery, a rechargeable nickel-metal hydride (NiMH) battery, or a rechargeable nickel-cadmium (NiCad) battery). The wireless power transmitter(s) 204 may be configured to transmit power in accordance with the Qi standard developed by the Wireless Power Consortium or some other wireless power standard.

The wireless transceiver(s) 206 are communicatively coupled to one or more wireless transceivers of the accessory. For the purposes of illustration and simplification, the term "wireless transceiver" is intended to cover components able to transmit data, receive data, or both. Moreover, a single wireless transceiver could include distinct components responsible for transmitting and receiving data signals.

Upon determining an accessory has been placed proximate to the wireless accessory bus 202, the wireless transceiver(s) 206 may be configured to automatically initiate a connection with the wireless transceiver(s) of the accessory. The wireless transceiver(s) 206 can then allow data to be transmitted between the user device 200 and the accessory. For example, if the accessory includes a digital camera, image data may be received by the wireless transceiver(s) 206 from the accessory. In some embodiments, an application associated with the accessory could also be downloaded from a network-accessible environment (e.g., a digital distribution platform such as a website or an app store) and/or launched in response to determining the accessory has been securely attached to the wireless accessory bus 202.

Oftentimes, the wireless transceiver(s) 206 communicates with the accessory via Wireless USB, which is a short-range, high-bandwidth wireless radio communication protocol. In such embodiments, the user device 200 includes multiple sources or interfaces at which USB signals can be received (i.e., a physical USB port and the wireless transceiver(s) 206 of the wireless accessory bus 202). Note, however, that other bi-directional communication protocols could also be used, such as Near Field Communication (NFC), Bluetooth, WiFi, a cellular data protocol (e.g., 3G or 4G), or a proprietary point-to-point protocol.

Oftentimes, the wireless accessory bus 202 includes a fastening component that enables the accessory to be securely attached to the user device 200. Here, for example, magnet(s) 208 are arranged around the wireless accessory bus 202 so that the accessory is in a predetermined orientation when attached to the user device 200. However, other materials and components could also be used. For example, a magnetic film could be deposited on an outer or inner surface of the housing 212 or mechanical tracks, clips, etc., could be affixed to the housing 212. The predetermined orientation may cause a wireless transmitter of the accessory to be aligned with, or disposed in close proximity to, the wireless transceiver(s) 206 of the user device 200.

The housing 212 also typically includes one or more breaks 210. These break(s) 210 may be necessary for permitting antenna(s) within the housing 212 to send and receive signals or could be for stylistic/aesthetic purposes. These break(s) 210 can include a substrate layer comprised of a non-metal material, such as glass or plastic, that allows signals to more readily pass through. However, in some embodiments the housing 212 may not include any breaks 210 (e.g., when the housing is composed of a material that allows wireless signals to more readily pass through).

As shown in FIG. 2, the wireless accessory bus 202 could be positioned in or around one of the break(s) 210. In such embodiments, one or more light emitting diodes (LEDs) 214 may be disposed underneath the substrate layer and configured to convey information about the user device 200 and/or an accessory. For example, the LED(s) 214 could illuminate when the accessory is brought near the user device 200, thereby indicating where the accessory should be attached. As another example, the LED(s) 214 may be able to convey operational information, such as whether the accessory is receiving sufficient power, is able to transfer data signals to the user device, is currently available for use, etc.

Figure 3:
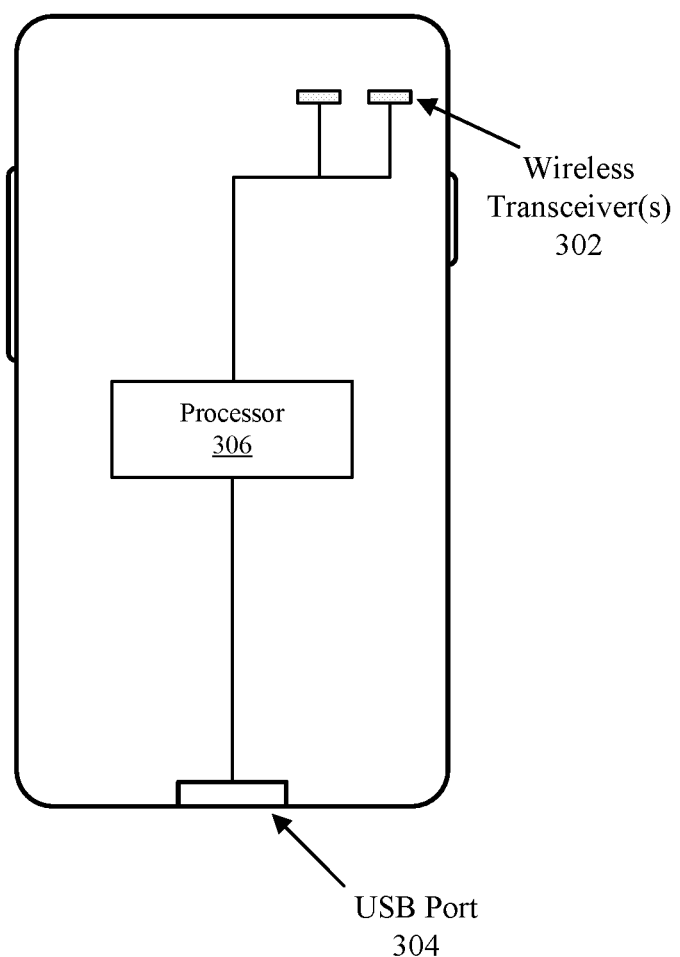
FIG. 3 is a high-level depiction of a user device that illustrates how the user device can simultaneously or sequentially receive USB signals from multiple sources.

FIG. 3 is a high-level depiction of a user device 300 that illustrates how the user device 300 can simultaneously or sequentially receive USB signals from multiple sources. Here, for example, the user device 300 includes one or more wireless transceivers 302 that can wireless communicate with an accessory and a USB port 304 that can receive a physical USB connector and communicate with a peripheral. Although the wireless transceiver(s) 302 do not create a physical USB interface, the wireless transceiver(s) 302 may communicate with the accessory using a USB-based protocol (e.g., Wireless USB).

Consequently, the wireless transceiver(s) 302 and USB port 304 each represent a distinct source of USB signals for a single user device. The wireless transceiver(s) 302 and the USB port 304 may be able to transmit and/or receive USB signals in accordance with one or more USB standards (e.g., USB 3.1, USB 3.0, or USB 2.0). For example, in some embodiments the USB port 304 is a USB Type-C connector that is able to communicate in accordance with both the USB 3.0 and 2.0 standards. The wireless transceiver(s) 302, meanwhile, may receive a wireless USB signal from an accessory that is transmitted in accordance with the USB 3.0 standard. Thus, the user device 300 could simultaneously or sequentially receive multiple USB signals from different sources.

In some embodiments, a processor 306 employs an algorithm to continuously or periodically determine which source is receiving USB signals, and then intelligently switch between the multiple sources. For example, the processor 306 may continually monitor an accessory has been wirelessly coupled to the wireless transceiver(s) 302 and whether a peripheral has been physically coupled to the USB port 304 (e.g., via a USB connector). The processor could then parse the USB signals in order to determine what accessory or peripheral has been coupled to the wireless transceiver(s) 302 or USB port 304, respectively.

Generally, the algorithm is used to intelligently determine which accessory and/or peripheral are connected to the user device 300 at a given point in time. The algorithm may consider numerous factors that affect whether the processor should begin analyzing USB signals received at a different source. For instance, the algorithm may monitor whether signal(s) are being received at certain physical contacts or "pins" of the USB port 304 and/or the a wireless accessory bus. More specifically, the algorithm may monitor whether a signal is presently being received at the ground pin(s), power pin(s), or reception/transmission pin(s) of a USB Type-C port. Additionally or alternatively, the algorithm may monitor whether a signal is presently being received at power pin(s) of the wireless accessory bus that protrude through the housing (as shown in FIG. 2).

Figure 4:
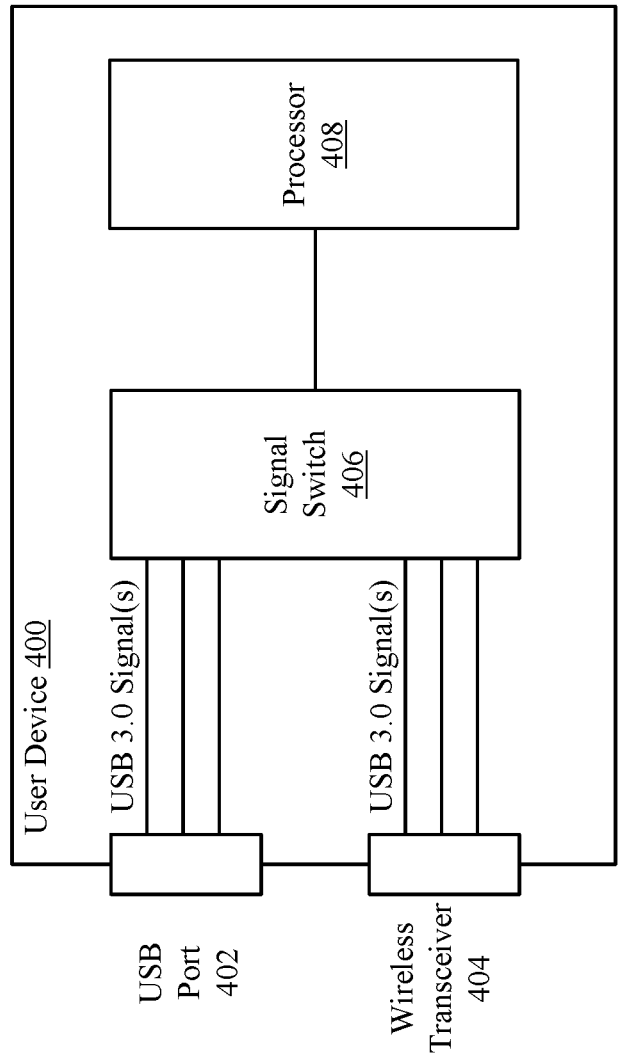
FIG. 4 depicts how a signal switch can be used to intelligently switch between different sources of USB signals.

FIG. 4 depicts how a signal switch 406 of a user device 400 can be used to intelligently switch between different sources of USB signals. Here, for example, the user device 400 includes a USB port 402 and a wireless transceiver 404 that may be part of a wireless accessory bus. In some embodiments, the USB port 402 is a USB Type-C port that enables USB signals to be transmitted and received in both the USB 3.0 and 2.0 standards. Although the wireless transceiver 404 does not represent a physical USB interface, the wireless transceiver may transfers data in accordance with the Wireless USB protocol.

The USB port 402 and the wireless transceiver 404 can simultaneously or sequentially receive USB signals from a peripheral and an accessory, respectively. When a USB signal is received at the user device 400, the USB signal is forwarded to a signal switch 406 that intelligently determines which source received the USB signal. The signal switch 406 can be implemented using hardware (e.g., an integrated circuit or "chip") and/or software (e.g., a switching routine). A "routine" is a portion of code within a larger program, such as the operating system or an application, that performs a specific task and is relatively independent of the remaining code. Thus, the switching routine may be executed by a particular module (e.g., a switching module). In some embodiments, the switching routine is executed using a state machine that transitions between the USB port 402 and the wireless transceiver 404 upon determining a triggering event has occurred that prompts a transition from one source to another. The triggering event could be, for example, reception of USB signals at a particular source or initiation of an application associated with a particular source.

Moreover, the signal switch 406 may continuously or periodically monitor whether signal(s) have been received at certain pin(s) in the USB port 402 or whether signal(s) have been received along a certain wireless communication channel established by the wireless transceiver 404. For example, the signal switch 406 may detect when power pin(s) within the USB port 402 are in contact with a USB connector. Similarly, the signal switch 406 may detect when power pin(s) near the wireless transceiver 404 are in contact with the power pin(s) of an accessory.

In some embodiments, the signal switch 406 also parses USB signals received at the user device 400 to discover characteristics of the USB signals. For example, the signal switch 406 may discover that a USB signal originates from a particular accessory or peripheral and should be passed to an application executing on the user device 400 that is associated with the particular accessory or peripheral.

Upon determining the source of the USB signal, the signal switch 406 can facilitate a link between the source (i.e., the USB port 402 or the wireless transceiver 404) and a processor 408. The processor 408 may be responsible for executing an operating system or application that utilizes the USB signal. Although FIG. 4 depicts USB 3.1 signals, other USB standards/specifications could also be used (e.g., USB 2.0, USB 3.0, and those to be developed in the future).

Figure 5:
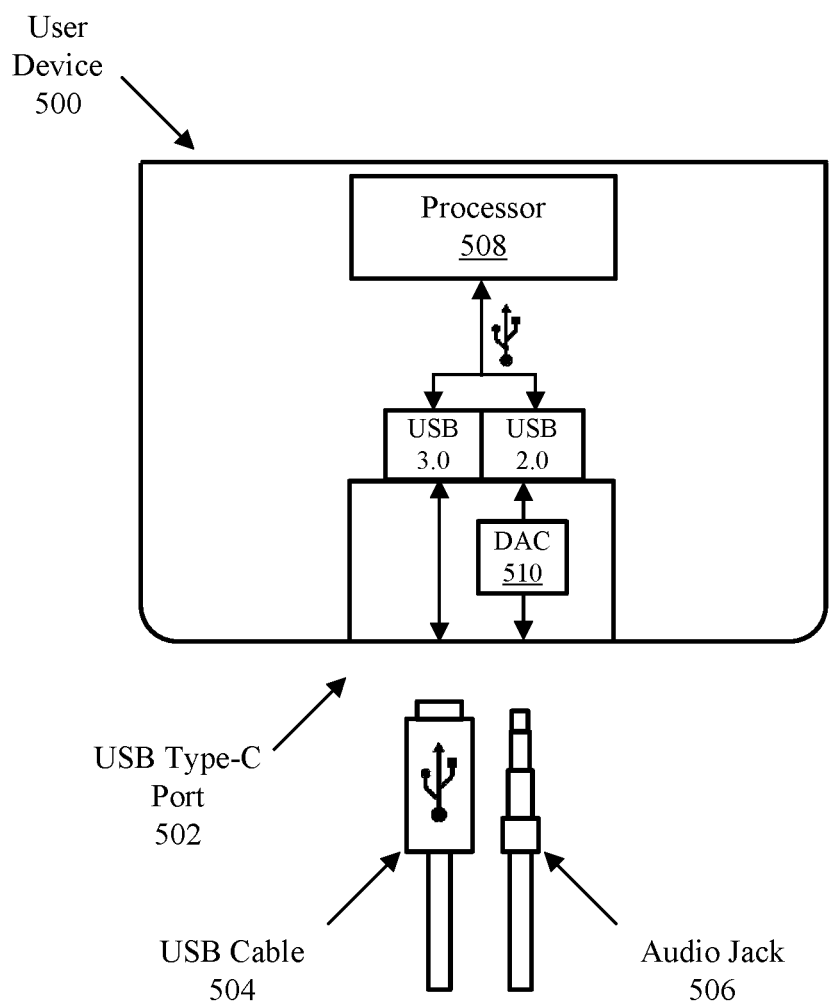
FIG. 5 is a high-level depiction of a USB Type-C port that illustrators how the port can be used to transfer power and/or data between a user device and an attached peripheral.

FIG. 5 is a high-level depiction of a USB Type-C port 502 that illustrators how the port can be used to transfer power and/or data between a user device 500 and an attached peripheral. The peripheral could be a source of power and/or data (e.g., an outlet, external memory, or personal computer), or a recipient of power and/or data (e.g., an external memory, personal computer, audio speaker, or set of headphones). In some embodiments, the USB Type-C port 502 is a pass-through interface that is able to transfer data, but cannot be used to transfer power.

Generally, the user device 500 (and, more specifically, a processor 508) can communicate with the peripheral connected to the USB Type-C port 502 in accordance with both the USB 3.0 and 2.0 standards. This allows the user device 500 to interface with both a USB cable 504 (which can transfer USB 3.0 signals) and an audio jack 506 (which can transfer USB 2.0 signals). The audio jack 506 could include a conventional 3.5 mm audio jack, a USB-type connector, or a proprietary connector.

A USB Type-C port 502 enables signals of different types to be transmitted from the same port. For example, non-audio digital signals could be forwarded directly from the processor 508 to the USB cable 504, while audio digital signals are typically passed through a digital-to-analog converter (DAC) 510 to produce an analog signal that is forwarded to the audio jack 506. The DAC 510 can convert a digital signal produced by the processor 508 into an analog signal that is audible to a user (e.g., via a set of headphones or a speaker). Both audio signals (i.e., the digital and analog signals) are usually produced in accordance with the USB 2.0 standard, while non-audio digital signals can normally be passed directly to the USB cable 504 in accordance with the USB 3.0 standard.

Figure 6:
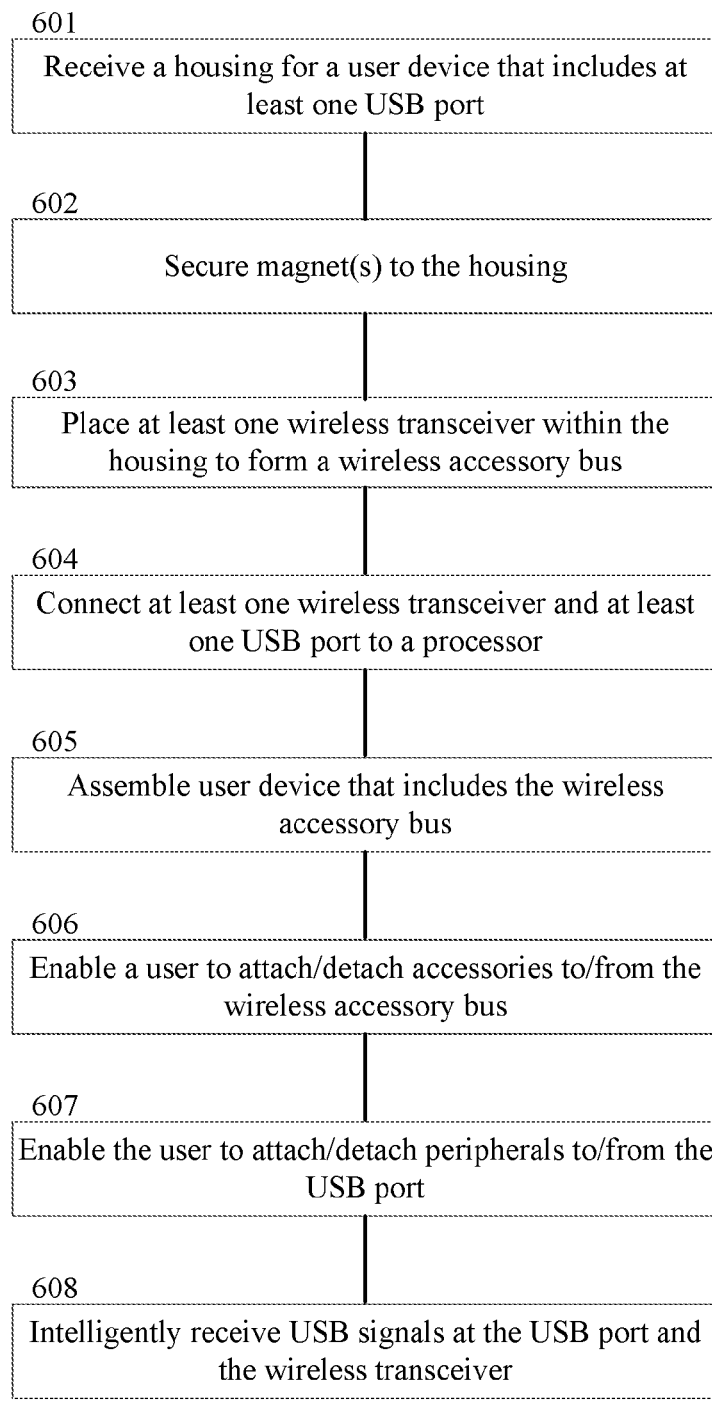
FIG. 6 depicts a process for manufacturing a user device that includes multiple sources capable of receiving USB signals.

FIG. 6 depicts a process 600 for manufacturing a user device that includes multiple sources capable of receiving USB signals. For example, the user device can include a physical USB port and a wireless accessory bus that includes at least one wireless transceiver, which can be communicatively coupled to an accessory. The wireless transceiver(s) enable the user device to communicate with the accessory via the Wireless USB protocol.

A housing that includes at least one USB port is initially received (e.g., by a manufacturer) (step 601). The housing is typically designed to protect various components (e.g., sensors, connectors, power supply) that reside within the user device. In some embodiments, a break is created in the housing. The break may be necessary for permitting antenna(s) within the housing to send and receive signals or could be for stylistic/aesthetic purposes.

Fastening components can then be affixed to the housing. For example, in some embodiments one or more magnets are secured to the inner surface of the housing near the break if one is present (step 602). The magnet(s) permit one or more accessories to be securely attached to the housing without requiring mechanical clips or connectors. Additionally or alternatively, a magnetic film could be deposited along the outer or inner surface of the housing. The user device can also be designed so that at least one wireless transceiver is disposed in or near the break (step 603). As shown in FIG. 2, the fastening component(s) (e.g., magnets) and wireless transceiver form a wireless accessory bus to which accessories can be magnetically, electrically, and/or communicatively coupled.

The wireless transceiver and USB port can then be connected to a processor (step 604). In some embodiments, the wireless transceiver and USB port are coupled to a signal switch that intelligently switches between the multiple sources of USB signals (i.e., the USB port and the wireless transceiver) so that USB signals can be simultaneously or sequentially received at both sources. Moreover, the signal switch may be able to determine which peripherals and accessories are connected to the user device at a given point in time based on the received USB signals. The processor is responsible for processing USB signals received at each source and executing various programs and/or applications. For example, the processor may initiate and run an application that is associated with an accessory attached to the wireless accessory bus or a peripheral attached to the USB port.

The user device, which includes at least one USB port and at least one wireless transceiver capable of communicating via the Wireless USB protocol, can then be assembled and provided to a user (step 605). The fastening component(s) of the wireless accessory bus permit the user to readily and repeatedly attach and detach the user device from accessories (step 606). For example, as the user brings an accessory and the user device within proximity to one another, magnet(s) secured to the inner surface of the housing may magnetically draw the accessory toward the wireless accessory bus. When the accessory is attached to the user device, the user device may automatically allow the user to utilize a new or improved functionality enabled by the accessory. For example, the user device may be able to capture an image using a camera accessory or project audio using a speaker accessory without requiring modification/installation of any hardware or software. Similarly, the USB port permits the user to readily and repeatedly attach and detach the user device from peripherals (step 607). For example, the user may connect the user device to an external storage by inserting a USB connector into the USB port of the user device.

After the user device has been assembled, a processor can intelligently receive USB signals at the USB port and the wireless transceiver (step 608). In some embodiments, a signal switch coupled to the processor determines whether an accessory is attached to the wireless accessory bus and whether a peripheral is attached to the USB port. For example, the signal switch may employ an algorithm that monitors whether signals are received at certain pins of the USB port, whether an authentication request has been received by the wireless transceiver, etc. The user device can then intelligently switch between the two sources so that USB signals can be received at both sources without being mixed up or disordered. For example, the processor and/or the signal switch may continuously or periodically monitor whether an accessory or a peripheral has begun transmitting USB signals to the wireless transceiver or USB port, respectively.

Figure 7:
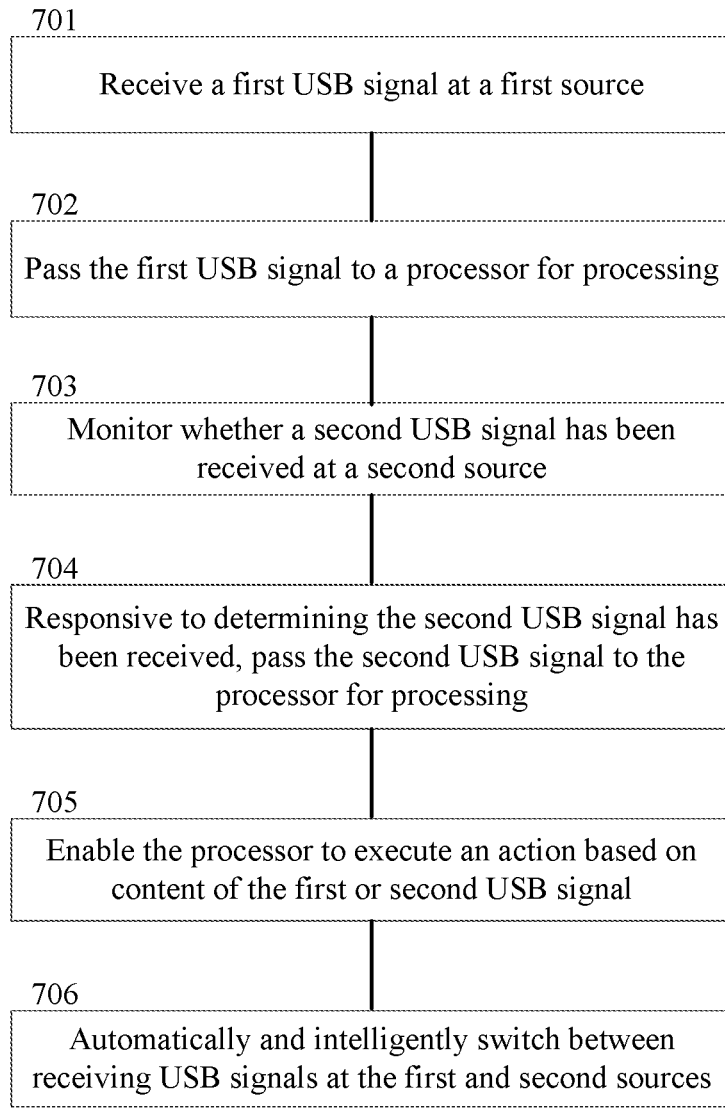
FIG. 7 depicts a process for intelligently processing USB signals received at two different sources of a user device.

FIG. 7 depicts a process 700 for intelligently processing USB signals received at two different sources of a user device. The first and second sources can represent a USB port and a wireless transceiver, or vice versa. Said another way, the terms "first source" and "second source" can be used to refer to either the USB port or the wireless transceiver.

The user device initially receives a first USB signal at a first source (step 701). The user device could be, for example, user device 200 of FIG. 2 or any other suitable electronic device. The first USB signal can then be passed (e.g., by a signal switch) to a processor for processing (step 702). Content within the first USB signal could be used by the processor to invoke an application or perform some other act (e.g., present information on a display or enable a new or improved functionality).

The signal switch can continuously or periodically monitor whether a second USB signal has been received at a second source (step 703). Responsive to determining the second USB signal has been received at the second source, the second USB signal can be passed (e.g., by the signal switch) to the processor for processing (step 704). As noted above, the second source is whichever of the USB port or the wireless transceiver is not the first source. For example, the first USB signal could be received from an accessory at the wireless transceiver, and the second USB signal could be received from a peripheral at the USB port. As another example, the first USB signal could be received from a peripheral at the USB port, and the first USB signal could be received from an accessory at the wireless transceiver.

In some embodiments, the signal switch is responsible for parsing, formatting, and/or analyzing the first and second USB signals before determining whether to pass them onward to the processor. More specifically, the signal switch could parse specific parts (e.g., the header, payload, or trailer) of a data packet that is transmitted in accordance with one of the USB standards. Metadata within the data packet may indicate which accessory or peripheral is responsible for transmitted the data packet to the user device. The processor can then execute an action (e.g., invoke an application or present information on a display) based on the content of the first USB signal and/or the second USB signal (step 705).

The processor and/or signal switch can automatically and intelligently switch between receiving USB signals at the first and second sources (step 706). For example, a user device (e.g., user device 300 of FIG. 3) may include both a USB port and a wireless transceiver that are able to transfer data and, in some cases, power. Both the USB port and the wireless transceiver may be configured to receive USB signals (despite the wireless transceiver not being a physical USB interface). The user device can process USB signals received at either source without complications by intelligently switching between the different sources. The processor and/or signal switch may do this by identifying which source has received a USB signal, which accessory or peripheral is responsible for transmitting the USB signal, etc. Proper attribution of the USB signal to the source and/or originator (i.e., the particular accessory or peripheral) ensures that all USB signals received at the user device are properly used by the processor.

Unless contrary to physical possibility, it is envisioned that the steps described above may be performed in various sequences and combinations. For instance, the user device may initially receive USB signals at either the USB port or the wireless transceiver. Other steps could also be included in some embodiments. For example, the user device may automatically download or initiate an application associated with an accessory upon determining the accessory has been connected to the wireless accessory bus. Similarly, the user device may automatically download or initiate an application associated with a peripheral upon determining the peripheral has been connected to the USB port.

Processing System

Figure 8:
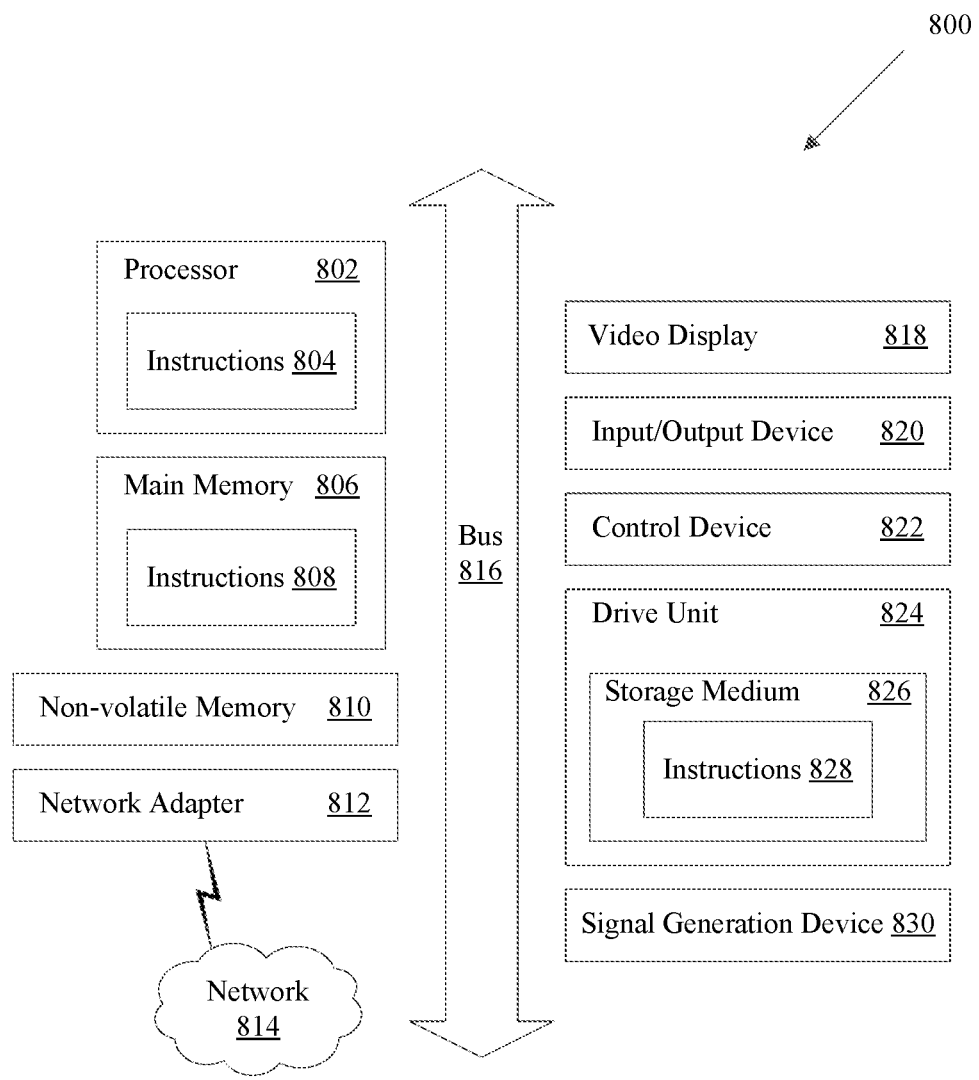
FIG. 8 is a block diagram illustrating an example of a processing system in which at least some operations described herein can be implemented.

FIG. 8 is a block diagram illustrating an example of a processing system 800 in which at least some operations described herein can be implemented. The computing system may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 800 operates as part of a user device (e.g., user device 300 of FIG. 3), although the processing system 800 may be connected (e.g., wired or wirelessly) to the user device. In a networked deployment, the processing system 800 may operate in the capacity of a server or a client machine in a client-server network environment, or as a peer machine in a peer-to-peer (or distributed) network environment.

The processing system 800 may be a server computer, a client computer, a personal computer (PC), a tablet PC, a laptop computer, a personal digital assistant (PDA), a mobile telephone, an iPhone®, an iPad®, a Blackberry®, a processor, a telephone, a web appliance, a network router, switch or bridge, a console, a hand-held console, a gaming device, a music player, or any portable, device or any machine capable of executing a set of instructions (sequential or otherwise) that specify actions to be taken by the processing system.

While the main memory 806, non-volatile memory 810, and storage medium 826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 812 enables the processing system 800 to mediate data in a network 814 with an entity that is external to the processing system 800 through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A computer-implemented method for switching between multiple sources of Universal Serial Bus (USB) signals, the method comprising:
   examining
      whether a USB connector is physically coupled to a USB port of an electronic device by determining whether a power signal is presently being received at a first electrical contact within the USB port, and
      whether an accessory is wirelessly coupled to a wireless transceiver of the electronic device by determining whether a physical connection is presently being maintained between a second electrical contact accessible through a housing of the electronic device and a third electrical contact accessible through a housing of the accessory;
   processing a first USB signal received at a first source, wherein the first source is the USB port or the wireless transceiver;
   determining that a second USB signal has been received at a second source,
      wherein the second source is whichever of the USB port and the wireless transceiver is not the first source; and
   executing a switching routine that enables the electronic device to sequentially receive the first and second USB signals at the first and second sources.

2. The computer-implemented method of claim 1, wherein said examining comprises:
   querying whether a first data packet has been received at the USB port that includes a field indicative of a USB format; and
   querying whether a second data packet has been received at the wireless transceiver that includes the field indicative of the USB format.

3. The computer-implemented method of claim 1, wherein the first and second USB signals include a header, a payload, and a trailer.

4. The computer-implemented method of claim 3, wherein the switching routine prompts a switch based on content included in the header, the payload, or the trailer of the first or second data packet.

5. The computer-implemented method of claim 1, wherein the switching routine is accomplished using a state machine that transitions between the first source and the second source in response to a determination that a triggering event has occurred.

6. The computer-implemented method of claim 5, wherein the triggering event is reception of a USB signal at the first or second source.

7. A non-transitory computer-readable medium with instructions stored thereon that, when executed by a processor, cause the processor to perform operations comprising:
monitoring
whether a Universal Serial Bus (USB) connector is physically coupled to a USB port of an electronic device by determining whether a power signal is presently being received at a first electrical contact within the USB port, and
whether an accessory is wirelessly coupled to a wireless transceiver of the electronic device by determining whether a physical connection is presently being maintained between a second electrical contact accessible through a housing of the electronic device and a third electrical contact accessible through a housing of the accessory; and
executing a switching routine that enables the electronic device to sequentially process USB signals at the USB port and the wireless transceiver.

8. The non-transitory computer-readable medium of claim 7, wherein the operations further comprise:
process a first USB signal received at a first source, wherein the first source is the USB port or the wireless transceiver;
determine that a second USB signal has been received at a second source, wherein the second source is whichever of the USB port and the wireless transceiver is not the first source; and
process the second USB signal.

9. The non-transitory computer-readable medium of claim 7, wherein the operations further comprise:
intelligently switch between the USB port and the wireless transceiver to receive the USB signals in real time.

10. The non-transitory computer-readable medium of claim 7, wherein the operations further comprise:
generate an interface that enables an individual to override the switching routine by manually specifying a particular source;
receive user input at the interface indicative of a request to process a USB signal received from the particular source; and
process the USB signal received from the particular source.

11. The non-transitory computer-readable medium of claim 7, wherein the USB port is a USB Type-C port capable of bi-directional data transfer.

12. The non-transitory computer-readable medium of claim 11, wherein the USB port is capable of interfacing with USB 3.0-compliant components and USB 2.0-compliant components.

13. An electronic device comprising:
a housing that includes
a wireless accessory bus for receiving an accessory, and
a Universal Serial Bus (USB) port for receiving a USB connector;
a wireless transceiver operable to communicate with the accessory via a Wireless USB communication link;
a signal switch operable to simultaneously or sequentially receive USB signals at the USB port and the wireless transceiver; and
a processor configured to
query whether the USB connector is coupled to the USB port by determining whether a power signal is presently being received at a first electrical contact within the USB port, and
query whether the accessory is coupled to the wireless transceiver by determining whether a physical connection is presently being maintained between a second electrical contact accessible through the housing of the electronic device and a third electrical contact accessible through a housing of the accessory.

14. The electronic device of claim 13, wherein the USB port is a USB Type-C port capable of bi-directional data transfer and bi-directional power transfer.

15. The electronic device of claim 13, wherein the USB port is capable of outputting, via a digital-to-analog (DAC) converter, an audio signal.

16. The electronic device of claim 13, wherein the USB connector is part of a peripheral device or a cable.

17. The electronic device of claim 13, further comprising:
a power source configured to
receive, via the first electrical contact, power from the USB connector, and
transfer, via the second electrical contact, power to the accessory.

18. The electronic device of claim 17, wherein the power source is a lithium-ion (Li-ion) battery, a nickel-metal hydride (NiMH) battery, or a nickel-cadmium (NiCad) battery.

19. The electronic device of claim 13, wherein the signal switch is an integrated circuit or a software module.

* * * * *